United States Patent

[11] 3,555,356

[72] Inventor Franz S. Kaiser
       Worthington, Ohio
[21] Appl. No. 812,076
[22] Filed Apr. 1, 1969
[45] Patented Jan. 12, 1971
[73] Assignee Robertshaw Controls Company
       Richmond, Va.
       a corporation of Delaware

[54] MOTOR PROTECTOR
     9 Claims, 2 Drawing Figs.
[52] U.S. Cl. .................................................. 317/13,
       317/33, 317/41, 317/132, 317/148.5, 318/473
[51] Int. Cl. ...................................................... H02h 7/085,
                                                                H02h 5/04
[50] Field of Search .......................................... 317/13, 33,
                                                41, 132, 148.5; 318/473

[56] References Cited
UNITED STATES PATENTS
3,329,869  7/1967  Obenhaus ..................... 317/13
3,366,843  1/1968  Evalds .......................... 317/13

Primary Examiner—James D. Trammell
Attorneys—Auzvill Jackson, Jr. and Robert L. Marben ABSTRACT: A motor protector circuit using thermal responsive sensors for controlling the circuit operation to protect the motor windings from damage due to overheating and using a current responsive electromagnetic sensing device for controlling the circuit operation to protect the motor windings from damage due to the prolonged application of current well in excess of the normal starting current for the motor. The thermal responsive sensors and the current responsive device are connected to control the operation of a thyristor which in turn controls the contactor connected to control the flow of current to the motor.

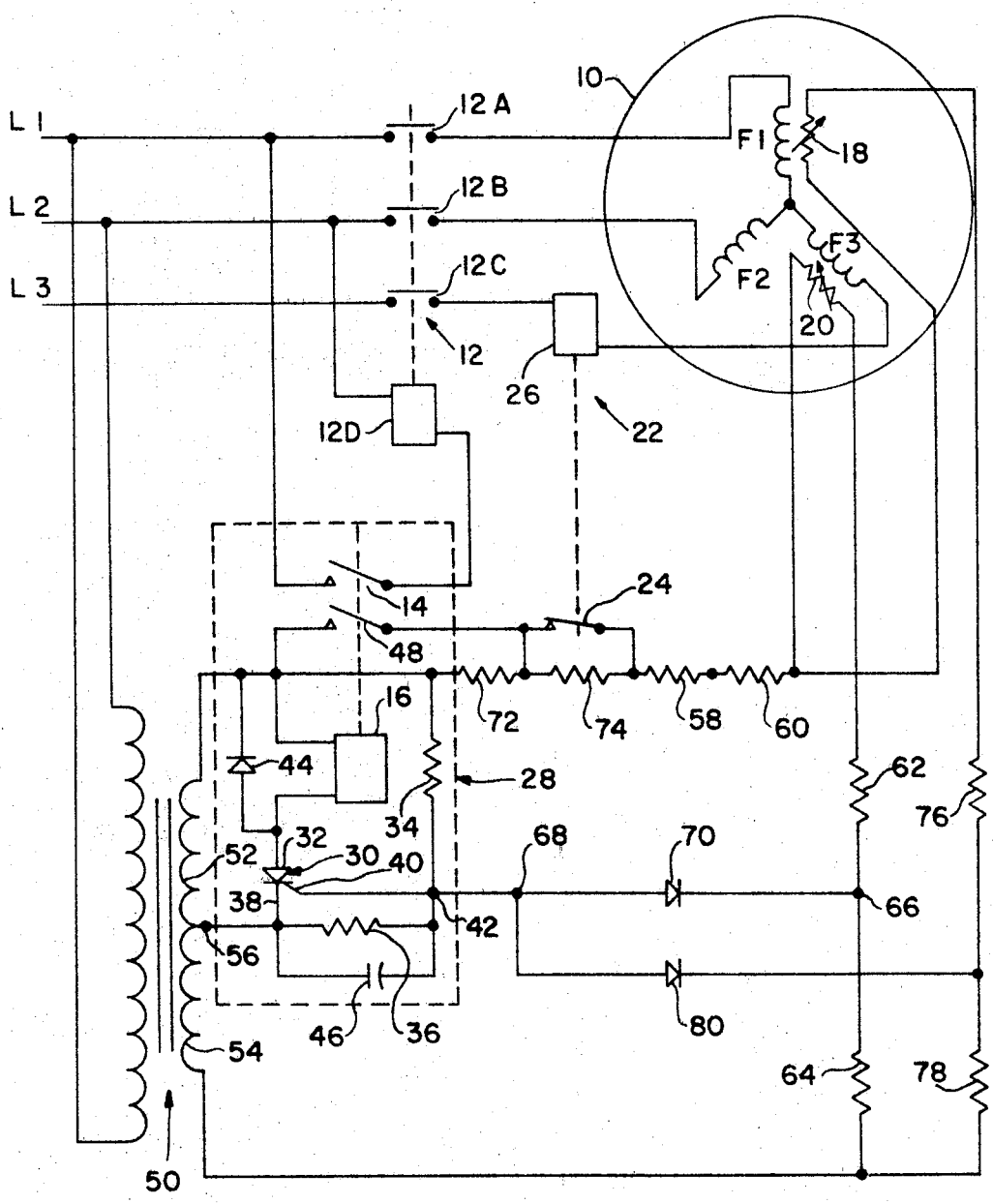
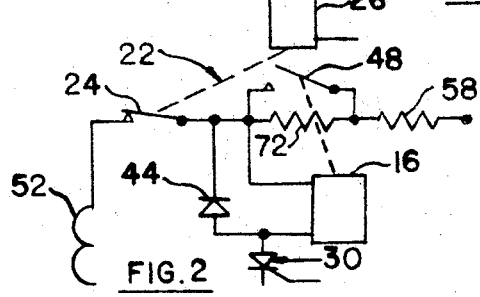
FIG. 1
FIG. 2
INVENTOR
FRANZ S. KAISER
BY
Robert L. Marben
ATTORNEY

MOTOR PROTECTOR

This invention relates to an improved motor protection circuit permitting operation of a motor near its maximum power rating.

Several thermal responsive protection circuits are available for protecting electric motors from damage due to overheating. One such circuit is disclosed in U.S. Pat. 3,366,843, assigned to the assignee of the present application. The circuit operation is controlled by thermally responsive sensors placed in the windings of the motor.

If all conditions of operation of an electric motor produced only a gradual rise in temperature the motor protection circuit could be designed with a set point or trip temperature corresponding to the highest winding temperature allowed for operation of the motor. The inherent thermal lag in sensors together with the thermal storage capacity of the rotor present a problem when there is a very rapid temperature rise such as occurs during a locked rotor condition. The very large thermal input created by the locked rotor current a large portion of which is stored in the rotor and the thermal lag of the sensor cause the temperature of the motor to rise beyond the set point or trip temperature of the protection circuit. The set point temperature therefore must allow for the temperature overshoot presented when a locked rotor condition is encountered. The set point temperature is therefore established below the temperature at which the motor can be operated under steady state conditions. This, of course, means the motor is operated at a power level requiring that it be assigned a power rating below that which could otherwise be given the motor.

It is an object of the present invention to provide detection of current levels presented by a locked rotor condition before the thermal input due to the high locked rotor current is effective to raise the temperature of the sensor used in a circuit of the type disclosed in U.S. Pat. 3,366,843 to the set point temperature for the circuit. A further object of the invention is to use this rapid detection of a locked rotor condition to effect a change in the protection circuit so it will operate at a temperature below the set point used in detecting any gradual rise in temperature of the motor. This arrangement makes it possible to establish a set point temperature for the protection circuit that is at the maximum temperature level possible for steady state operation of the motor.

Briefly, the invention involves a modification of the protection circuit shown in US. Pat. 3,366,843. In the embodiments disclosed in this application the modification is effected by a locked rotor current electromagnetic sensing device which includes a switch used to control the operation of the electronic switching means in the protection circuit.

This invention is embodied in the circuitry shown in the accompanying drawings and is described in detail with the scope of the invention indicated in the appended claims. The drawings are as follows:

FIG. 1 is a schematic circuit diagram embodying the invention; and

FIG. 2 is a partial showing of the drawing of FIG. 1 modified to illustrate another embodiment of the invention.

For purposes of illustration the protection circuit of FIG. 1 embodying the invention is connected to control the circuitry for connecting and disconnecting a motor 10 from its three phase supply lines L1, L2 and L3. The motor 10 is shown having stator windings F1, F2 and F3 which are Y or star-connected. The teachings of the invention contained herein are equally applicable for the protection of a delta wound three phase motor or single phase motor. An electroresponsive contactor normally forms a part of the circuitry for connecting and disconnecting a motor from its source of three phase power. Thus, a contactor 12 is shown having normally open contacts 12a, 12b and 12c connected in lines L1, L2 and L3 leading to the free ends of stator windings F1, F2 and F3, respectively. The contactor 12 a,12b and 12c needed for energization of the stator windings F1, F2 and F3.

The energization of the coil 12d of contactor 12 is controlled by the remainder of the circuitry shown. Thus, coil 12d is connected across lines L1, L2 of the three phase power source via a switch 14 of relay 16. As will be explained, the energization of relay 16 is dependent on the temperature sensed by sensors 18 and 20 placed adjacent the windings F1 and F3 of motor 12, respectively, or by the energization of a locked rotor current electromagnetic sensing means 22 which includes the switch 24 and coil 26. The coil 26 is designed to operate above the minimum rated starting current for the motor 10 so it will not open the switch 24 when the minimum rated starting current is being drawn by the motor, but will immediately respond to the higher locked rotor current to cause switch 24 to be opened.

The portion of the circuitry enclosed within the dotted line, which includes the relay coil 26 and switch 14 that have been mentioned, can be viewed as a phase sensitive switch means 28. The remaining portion of the circuitry to which it is connected is a bridge circuit network which normally produces an output signal in accordance with the temperature of the stator windings of motor 10. The bridge network output is applied to the phase sensitive switch means to control its mode of operation in accordance with the temperature of the stator windings of motor 10. The bridge network is applied to the phase sensitive switch means to control its mode of operation in accordance with the temperatures sensed at the sensors 18 and 20 placed in the motor windings.

The switch means 28 includes a phase sensitive electronic switch device, such as a thyristor, i.e., a semiconductor having control characteristics similar to those of a thyratron tube. A silicon controlled rectifier (SCR) is one phase sensitive electronic switch of the general type mentioned that has been found to be satisfactory. The SCR 30 has its anode 32 connected to the relay coil 16. The switch means 28 also includes a biasing circuit consisting of two series connected resistors 34, 36 connected in parallel with the series circuit comprising relay coil 16 and the SCR 30. Resistor 34 is connected to the relay coil 16 and resistor 36 is connected to the cathode 38 of SCR 30. The gate electrode 40 of SCR 30 is connected to the connection 42 common to the series connected resistors 34, 36. A diode 44 is connected across the relay coil 16 with its anode connected to the anode 32 of SCR 30. The relay 16, as will be explained, is energized only during one half of each cycle of alternating current. The impedance presented by the relay 16 is inductive and therefore tends to keep the current flowing. This inductive characteristic is utilized by connecting the diode 44 as mentioned so any current flow through the relay winding 16 will continue in the same direction beyond the point when the SCR 30 is turned off. This prevents relay 16 from dropping out during the "off" or negative half of each cycle of the AC voltage source. A capacitor 46 is connected across the resistor 36 to provide a low impedance path for any high voltage pulses that may appear in the AC voltage supplied to the bridge network. One other item considered a part of the switch means 28 is a second set of contacts 48 controlled by the relay 16.

The bridge circuit network is energized via the stepdown transformer 50 with the upper half 52 of the secondary winding providing one leg of the bridge network and the lower half 54 providing a second leg. The primary winding is shown connected across lines L1, L2 which are connected across lines L1, L2 which are connected to an AC power source (not shown). The secondary winding has a center tab 56 which provides one output terminal of the bridge network. The phase sensitive switch means is connected across the upper half 52 of the secondary winding with the relay 16 and cathode of diode 44 connected to the upper end of the secondary winding and the cathode 38 of SCR 30 plus resistor 36 and capacitor 46 connected to the center tap 56.

The bridge circuit network it will be seen includes two basic bridge circuits in which the upper and lower halves of the secondary winding of transformer 50 provide two legs 52 and 54 in each bridge circuit. A first bridge circuit presented when the SCR 30 is in the "on" mode of operation includes the two legs 52 and 54, a third leg of series connected elements including contacts 48 of relay 16 which are then closed, contact 24 of locked rotor current electromagnetic sensing means 22 which are closed, resistance 58, resistance 60 thermally responsive resistive sensor 20 and resistance 62 and a fourth leg formed by resistance 64 connecting the third leg to leg 54. The connection 66 common to the third leg and leg 54 of the first bridge circuit which can be considered an output terminal for the first bridge circuit is connected to the output terminal 68 for the network via diode 70. The diode 70 has its anode connected to the output terminal 68 and its cathode connected to the connection 66. The thermally responsive resistive sensor 20 is positioned in the motor 10 to sense the temperature at one of the windings. In the drawing the sensor 20 is shown positioned to sense the temperature at winding F3. The switch contacts 48 and 24 when closed short out resistance elements 72 and 74, respectively. Resistance elements 72 and 74 are connected in series between the upper end of leg 52 and resistance 58. Contacts 48 are connected to short out resistance 72 when closed and contacts 24 are connected to short out resistance 74 when closed. The contacts 48 of relay 16 are open when relay 16 is not energized and are closed to short out resistance 72 when the SCR 30 is in the "on" mode of operation. When SCR 30 is in the "off" mode of operation the contacts 48 are open so the third leg of the first bridge circuit just described is modified by the addition of resistance 72 to the third leg since opening of contacts 48 removes or opens the short circuit path around resistance 72. Contacts 24 are normally closed and open only when the locked rotor current electromagnetic sensing means 22 is subjected to a current level which is above the normal start up current. Current of this level occurs when attempt is made to start the motor 10 under locked rotor conditions. The opening of contacts 24 removes or opens the short circuit path around resistance 74 so the third leg of the first bridge circuit is modified by the addition of resistance 74 to the third leg.

The circuitry as described to this point provides a control system which is suitable for protecting a single phase motor from damage due to excessive temperature and also terminates the motor operation of the current exceeds the normal start up current for the motor.

Operation of the circuitry described to this point will be discussed without first taking up the description of the second bridge circuit in the bridge circuit network.

The SCR 30 presents a low internal resistance to current flow when the anode 32 is positive with respect to the cathode and exceeds a certain minimum voltage called the forward breakdown voltage. The AC supply lines L1, L2 to which the transformer 50 is connected provide an alternating voltage across anode 32 and cathode 38. The transformer is a 24V stepdown transformer which provides 12V to the anode-cathode circuit portion. The forward breakdown voltage for the SCR 30 is not met by the 12 volts available across leg 52. The forward breakdown voltage is modified by a voltage applied to gate electrode 40 provided such voltage is positive with respect to the cathode and is applied at the same time the forward voltage is presented at the anode 32. The nominal gate voltage is 0.6 volt at 25° C and decreases slightly at a substantially uniform rate with an increase in temperature. When the forward breakdown voltage required is thus modified by such a gate signal, the high internal resistance of the SCR changes to a very low valve to permit a high current flow through the device. Once the SCR is triggered by the gate signal to the "on" mode of operation the current flow is independent of the gate voltage or current to the SCR remains in the "on" mode until the anode current is reduced to a level below that required to sustain conduction.

The biasing circuit which includes the two resistors 34 and 36 provides the necessary gate voltage to place the SCR 30 in the "on" mode during at least a portion of each half cycle when the anode 32 is positive with respect to the cathode 38 to energize the relay 16 causing switches 14 and 48 to close.

Closure of switch 14, of course, completes the circuit to contactor 12. Energization of contactor 12 causes switches 12A, 12B and 12C to close completing the circuit for energizing motor 10. As mentioned earlier, the relay 16 remains operative during the negative half cycles due to the diode 44 connected across the relay 16 thus keeping switches 14 and 48 closed.

The "on" mode of operation of SCR 30 continues so long as the sensor 20 is responding to a temperature equal to or above the set point temperature of the first bridge circuit and switch 24 remains closed. When the sensor 20 is responding to the normal or acceptable operating temperature of the motor winding, the resistance presented by resistors 58, 60, 62, 64 and sensor 20 is such as to cause point 66 to be positive with respect to point 68 during the positive half cycles of the voltage present across the secondary winding of the transformer 50. This being the case the first bridge circuit is not effective to alter the gating signal for SCR 30 since there is no current flow from point 42 to 66 via diode 70. As the temperature sensed by sensor 20 rises, the resistance presented by sensor 20 increases causing the voltage drop across the third leg of the first bridge circuit during the positive half cycle to increase until until point 66 is negative with respect to point 42 by an amount sufficient to cause diode 70 to present a low impedance path for current flow from point 42. The current passing from point 60 through diode 70 during each positive half cycle also passes through resistor 34 causing the voltage drop across resistor 34 to increase thereby reducing the voltage drop across resistor 36. The current flow through diode 70 increases with further increase in the temperature sensed causing a further increase in the voltage drop across resistor 34 with a further decrease in the voltage across resistor 36 until the voltage drop across resistor 36 has decreased to the point where it is not sufficient to place the SCR 30 in the "on" mode. The action of the first bridge circuit is thus effective to place the SCR 30 in the "off" mode of operation. The temperature at which the "off" mode is established corresponds to the temperature which is considered unsafe for operation of the motor 10 and is referred to as the set point temperature of the system.

Placing the SCR 30 in the "off" mode causes switches 48 and 14 to open. The circuit to the coil 12D of contactor 12 is thus opened when a switch 14 opens causing the switches 12A, 12B and 12C to open disconnecting the motor 10 from the power supply. Switch 48 upon opening removes the short circuit around resistor 72 causing resistance 72 to add to the resistance presented by the third leg of the first bridge circuit. This increase in resistance causes the voltage at point 66 to become more negative with respect to the network output connection 68. The voltage at point 66 will increase only by a reduction of the resistance in the third leg. This reduction is brought about by the change in resistance presented by sensor 20 as the motor windings cool. The resistance added by resistance 72 requires the temperature at the sensor 20 to drop below the set point temperature before the SCR 30 will be placed in the "on" mode again. The magnitude of the resistance 72 will determine the temperature to which the motor must cool before the SCR 30 is turned "on." This will occur when point 66 in the first bridge circuit becomes more positive than point 68 so diode 70 cannot conduct. With diode 70 not conducting the biasing resistors 34 and 36 provide the necessary triggering signal for the SCR 30 to place it in the "On" mode again.

A second bridge network modifying action is brought about by the electromagnetic sensing means 22 which is responsive to current flow that is above the minimum rated starting current for the motor 10 to open switch 24. The opening of switch 24 is effective to remove the short circuit around resistor 74 and thus made resistor 74 an effective part of the bridge network. Locked rotor condition, for example, will cause the starting current for the motor 10 to exceed the minimum related starting current.

If the electromagnetic sensing means 22 and the associated resistance 74 were not used, the circuit would function as has been described with the excessive starting current causing the temperature of the motor 10 to exceed the set point temperature. This is the case for the circuit disclosed in U.S. Pat. 3,366,843. A high starting current such as occurs during a locked rotor condition causes the temperature of the motor windings to rise very rapidly due to the extremely large thermal input. The thermal lag of the sensors 18 and 20 becomes a factor during very rapid temperature rise situations as does the thermal storage capacity of the rotor. Thus, though a sensor responds at a given set point to terminate the motor operation, the thermal lag and heat stored in the rotor causes the windings to rise in temperature well above the set point temperature after the current input to the motor has been terminated. This problem does not arise when the temperature rise takes place over a longer period of time. The set point temperature for which the circuit of U.S. Pat. 3,366,843 is adjusted must, of course, be based on the worst condition, i.e., the locked rotor condition. Thus in order for the circuit per U.S. Pat. 3,366,843 to protect a motor against high temperatures caused by a locked rotor condition, the set point must allow for the temperature overshoot requiring that it be established at a point which is below the maximum temperature that can be tolerated by the windings. The addition of the current responsive electromagnetic sensing means 22 and its associated switch 24 for controlling the addition or removal of resistor 74 from the control circuitry permits the control circuitry to be adjusted for use at a set point which is higher than that which could be used by the circuitry per U.S. Pat. 3,366,843. A motor can therefore be operated close to its assigned power rating when protected by a control circuit made in accordance with the invention presented herein since the current responsive sensing means 22 will operate to take care of the locked rotor condition serving to operate the circuit so as to shut down the motor operation before the temperature of the windings reaches the set point temperature and the temperature sensors 18 and 20 can operate the circuit for terminating the motor operation when a condition causes the temperature of the windings to exceed the set point temperature.

The elements that remain to be described also formed a part of the circuit disclosed in U.S. Pat. 3,366,843. The remaining elements are sensor 18, resistances 76 and 78 and diode 80. These elements serve to establish a second bridge circuit in the bridge network using elements that are common to the first and second bridge circuits. Operation of the second bridge circuit is identical to that of the first bridge circuit with sensor 18, resistances 76 and 78 and diode 80 corresponding to sensor 20, resistances 62 and 64 and diode 70, respectively, in the first bridge circuit. The cathode of diode 80 is connected to the output for the second bridge circuit which is the connection 82 common to the resistors 76 and 78. The second bridge circuit provides a second sensor so the circuit will provide protection against high temperatures should the power to one phase of a Y or star wound three phase motor be cut off due to failure of a power line or should one phase of the motor windings open.

As is the case for the circuit per U.S. Pat. 3,366,843, resistor 58 provides temperature compensation and resistor 60 is used to reduce the shift in the set point that occurs by the use of two sensors. The temperature compensation and shift in set point problems are discussed in detail in U.S. Pat. 3,366,843.

FIG. 2 illustrates another embodiment of the invention. The circuitry for the second embodiment uses the same circuitry as is used for FIG. 1 except that the position of the switch 24 is changed and resistor 74 is removed from the circuit. Only that portion of FIG. 1 is repeated in FIG. 2 as is needed to show these changes. The reference numerals used in FIG. 2 identify the same components that appear in FIG. 1.

Switch 24 of the locked rotor current electromagnetic sensing means 22 is connected to control the application of power to the electronic switch means 28 and for purposes of illustration is shown specifically connected between the upper end of the secondary winding of transformer 50. Thus, if the sensing means 22 responds to a current level sufficient to operate switch 24, the SCR 30 will be placed in a nonconducting mode resulting in deenergization of relay 16 and therefore deenergization of the contactor 12 to terminate the flow of current to the windings of motor 10 and cause switch 24 to close. Deenergization of relay 16, of course, causes switch 48 to open placing 72 in the bridge circuit thus requiring the temperature of the temperature responsive sensors 18 and 20 in the motor windings to drop a sufficient amount to permit the SCR 30 to again be placed in the conducting mode.

It is readily apparent that the connection of the power source to SCR 30 could also be interrupted by positioning switch 24 at any point in the circuitry connecting the power source to any of the electrodes of SCR 30 and thus place the SCR 30 in the nonconducting mode in response to the opening of switch 24 upon energization of the coil 26 of the current sensing means 22.

I claim:

1. In control circuitry responsive to temperature of the type wherein the energization of the windings of an electric motor is controlled via a relay operated in accordance with the operation of an electronic switch means controlled by a circuit connected to the electronic switch means, the circuit including at least one temperature responsive sensor positioned in the windings of the electric motor, the circuit placing the electronic switch means in a condition altering the operation of the relay to terminate energization of the motor windings when the temperature of the temperature responsive sensor rises to a predetermined temperature the combination with said circuit connected to said electronic switch means of a device responsive to a predetermined level of current flow to the winding of the electric motor, said device when responding to said predetermined level of current flow altering said circuit causing said electronic switch means to be placed in a condition altering the operation of said relay to terminate energization of the motor windings.

2. The combination in accordance with claim 1 wherein said device includes a set of electrical contacts connected in said circuit and operated to effect said altering of said circuit when said device responds to said predetermined level of current flow.

3. In control circuitry responsive to temperature of the type wherein the energization of the windings of an electric motor is controlled via a relay operated in accordance with the operation of an electronic switch means controlled by a circuit connected to the electronic switch means, the circuit including at least one temperature responsive sensor positioned in the windings of the electric motor, the circuit placing the electronic switch means in a condition altering the operation of the relay to terminate energization of the motor windings when the temperature of the responsive sensor rises to a predetermined temperature with the altered operation of the relay effecting operation of a set of electrical contacts connected in the circuit causing said circuit to be altered so the electric switch means remains in said condition until the temperature of the temperature responsive sensor drops to a lower predetermined temperature the combination with said circuit connected to said electronic switch means of a device responsive to a predetermined level of current flow to the windings of the electric motor, said device when responding to said predetermined level of current flow changing said circuit causing said electronic switch means to be placed in a condition altering the operation of said relay to terminate energization of the motor windings.

4. The combination in accordance with claim 3 wherein said device includes a set of electrical contacts connected in said circuit and operated for so long as said device is responding to said predetermined level of current flow, said set of electrical contacts when so operated effecting said changing of said circuit.

5. The combination in accordance with claim 3 wherein said circuit includes a resistive element with said set of contacts connected to said resistive element to short out said resistive element when said contacts are closed.

6. In control circuitry responsive to temperature of the type wherein the energization of the windings of an electric motor is controlled via a relay operated in accordance with the operation of an electronic switch means controlled by a circuit connected to the electronic switch means, the relay being energized when the electronic switch means is in a conducting mode, the circuit including at least one temperature responsive sensor positioned in the windings of the electric motor, the circuit placing the electronic switch means in a nonconducting mode deenergizing the relay to terminate energization of motor windings when the temperature of the temperature responsive sensor rises to a predetermined temperature, the deenergized relay effecting operation of a set of contacts connected in the circuit causing said circuit to be altered so the electric switch means remains in the nonconducting mode until the temperature of the temperature responsive sensor drops to a predetermined temperature the combination with said circuit connected to said electronic switch means of a device responsive to a predetermined level of current flow to the windings of the electric motor, said device when responding to said predetermined level of current flow changing said circuit causing said electronic switch means to be placed in a nonconducting mode deenergizing said relay to terminate energization of the motor windings.

7. The combination in accordance with claim 6 wherein said device includes a set of electrical contacts connected in said circuit and operated to effect said changing of said circuit when said device responds to said predetermined level of current flow.

8. In control circuitry responsive to temperature of the type wherein the energization of the windings of an electric motor is controlled via a relay operated in accordance with the operation of an electronic switch means connected to a source of power and controlled by a circuit connected to the electronic switch means, the relay being energized when the electronic switch means in a conducting mode, the circuit including at least one temperature responsive sensor positioned in the windings of the electric motor, the circuit placing the electronic switch means in a nonconducting mode deenergizing the relay to terminate energization of the motor windings when the temperature of the temperature responsive sensor rises to a predetermined temperature, the deenergized relay effecting operation of a set of contacts connected in the circuit causing said circuit to be altered so the electric switch means remains in the nonconducting mode until the temperature of the temperature responsive sensor drops to a predetermined temperature the combination with said electronic switch means of a device responsive to a predetermined level of current flow to the winding of the electric motor, said device when responding to said predetermined level of current flow interrupting the connection of said power source to said electronic switch means causing said electronic switch means to be placed in a nonconducting mode deenergizing said relay to terminate energization of the motor windings.

9. The combination in accordance with claim 8 wherein said device includes a set of electrical contacts connected to control the connection of said power source to said power electronic switch means and operated for so long as said device is responding to said predetermined level of current flow, said set electrical contacts when so operated interrupting the connection of said power source to said electronic switch means.